United States Patent [19]

Coetzee

[11] Patent Number: 4,732,404
[45] Date of Patent: Mar. 22, 1988

[54] BICYCLE

[76] Inventor: Abel O. Coetzee, Plot 117 Witfontein 0116, Pretoria North, Johannesburg, Transvaal Province, South Africa

[21] Appl. No.: 836,311

[22] Filed: Mar. 5, 1986

[30] Foreign Application Priority Data

Mar. 7, 1985 [ZA] South Africa .................. 85/1708

[51] Int. Cl.$^4$ .............................................. B62K 19/04
[52] U.S. Cl. .................................. 280/283; 74/594.6; 267/47
[58] Field of Search .............. 280/283, 284, 275, 276; 74/594.1, 594.4, 594.5, 594.6; 267/47, 148, 149

[56] References Cited

U.S. PATENT DOCUMENTS

| 392,523 | 11/1888 | Owen | 280/284 |
|---|---|---|---|
| 434,234 | 8/1890 | Barker | 280/283 |
| 493,696 | 3/1893 | Ferguson | 74/594.6 |
| 567,430 | 9/1896 | Williams | 280/283 |
| 621,942 | 3/1899 | Pierce | 280/276 |
| 1,114,855 | 10/1914 | Buckland | 280/275 |
| 1,438,919 | 12/1922 | Kelly | 280/275 |
| 1,745,963 | 2/1930 | Trouche | 280/283 |
| 1,977,317 | 10/1934 | Maypole | 280/283 X |
| 2,162,762 | 6/1939 | Snell | 280/283 |
| 2,194,103 | 3/1940 | Tibbals | 280/283 |
| 2,603,104 | 7/1952 | Issac | 74/594.6 |
| 2,756,071 | 7/1956 | Riva | 280/283 |
| 4,458,910 | 7/1984 | Stillwagon | 74/594.6 X |
| 4,530,490 | 7/1985 | Misumi et al. | 267/47 |
| 4,546,958 | 10/1985 | Ohno et al. | 267/47 |
| 4,556,204 | 12/1985 | Pflederer | 267/47 X |

FOREIGN PATENT DOCUMENTS

| 920092 | 4/1923 | Austria | 280/283 |
|---|---|---|---|
| 459750 | 5/1928 | Fed. Rep. of Germany | 280/283 |
| 10394 | 7/1890 | United Kingdom | 280/283 |
| 175955 | 11/1921 | United Kingdom | 280/283 |
| 1603125 | 11/1981 | United Kingdom | . |

Primary Examiner—John J. Love
Assistant Examiner—Mitchell J. Hill
Attorney, Agent, or Firm—Rines and Rines

[57] ABSTRACT

This invention relates to a bicycle. The bicycle includes a frame joining the front and rear wheels where the frame comprises a leaf spring suspension which enables the front and rear wheels to resiliently pivot relative to one another. The saddle and pedal mechanism are attached to the suspension.

6 Claims, 3 Drawing Figures

BICYCLE

INTRODUCTION TO THE INVENTION

This invention relates to a bicycle and to a frame therefor.

BACKGROUND TO THE INVENTION

Bicycles are widely used both as a means of transportation as well as for sport and leisure purposes and are available in several designs. Basically they consist of a rigid frame, two wheels attached thereto, a saddle, a pedal mechanism and a steering mechanism. Furthermore, some of the designs include a suspension system in the form of helical coils about shock absorbers which are normally positioned above the rear wheel or front wheel or both, and are integral with the bicycle frame.

It is also known to use leaf springs extending between the rear wheel and front wheel mountings of the bicycle. Such leaf springs by themselves however, allow for excess twisting movement of the wheels with respect to each other and this movement has had to be compensated by various means such as additional frame members for example. Often the leaf springs are mounted using means which allow for a certain amount of rotational movement about the mounting.

As many bicycles are often used over rough terrain and particularly for jumping purposes by children, an object of this invention is to provide a relatively inexpensive but effective suspension system for bicycles whereby use of the bicycles for jumping purposes is enhanced. A further object is to provide a bicycle of simple design and construction and which is easy to dissemble.

SUMMARY OF THE INVENTION

In this specification the term leaf spring includes not only spring steel leaf springs but also leaf springs of other material and of cross sectional configurations other than rectangular, and a leaf spring set comprises at least one such leaf spring.

According to the invention there is provided a bicycle frame comprising:

a front wheel mounting connected to a rear wheel mounting solely by a single leaf spring set to enable the front and rear wheel mounting to resiliently pivot about a single pivotal position on loading of the bicycle.

Further according to the invention the frame includes a seat mounting mounted to the leaf spring set substantially at the pivotal position and the seat mounting including a mounting member extending perpendicularly to the leaf spring set.

Still further according to the invention the frame includes a pedal drive mechanism mounted to the leaf spring set substantially adjacent the pivotal point, and the pedal drive mechanism comprises a chain driving sprocket and a set of foot pedals for use in rotating the driving sprocket.

Still further according to the invention the leaf spring set comprises at least one leaf spring of rectangular cross section.

The invention also provides a bicycle comprising a frame as described above.

Further according to the invention the bicycle comprises a front wheel and front mounting therefor; a rear driving wheel and rear mounting therefor; the front mounting and rear mounting being connected solely by a single leaf spring set to provide an upward resilient bias on loading of the bicycle;

a seat mounting mounted to the leaf spring set substantially midway between the axles of the front and rear wheels;

a pedal chain drive mechanism for driving the rear wheel mounted to the leaf spring set substantially directly below the seat mounting.

Still further according to the invention the seat mounting and pedal chain drive mechanism are located approximately midway along the length of the leaf spring set.

Still further according to the invention the pedal chain drive mechanism includes foot pedals each comprising a lower load bearing member and an upper lifting member spaced from the load bearing side of the load bearing member and joined to the load bearing member at at least the inner end thereof.

BRIEF DESCRIPTION OF THE DRAWINGS

An embodiment of the invention described by way of example only follows with reference to the accompanying drawings in which.

DETAILED DESCRIPTION OF THE DRAWINGS

Figure 1:
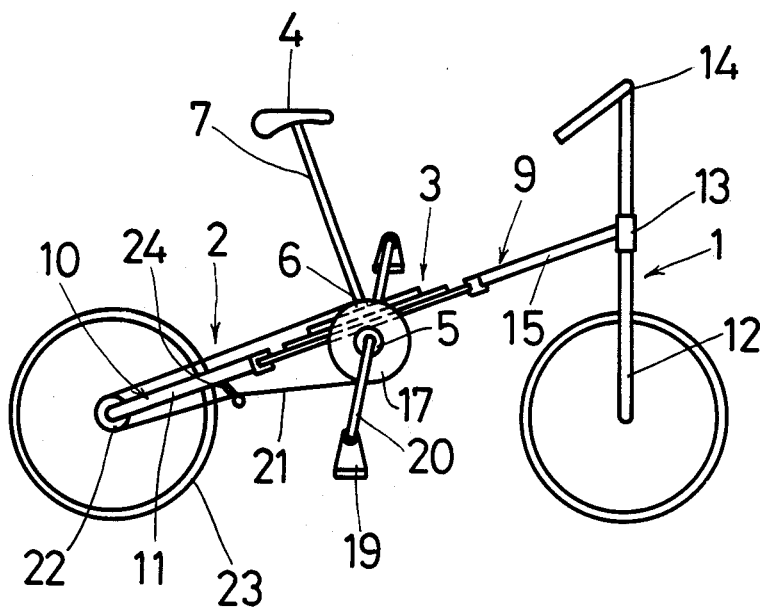
FIG. 1 illustrates diagramatically and in side view, a bicycle according to the invention.
Figure 2:
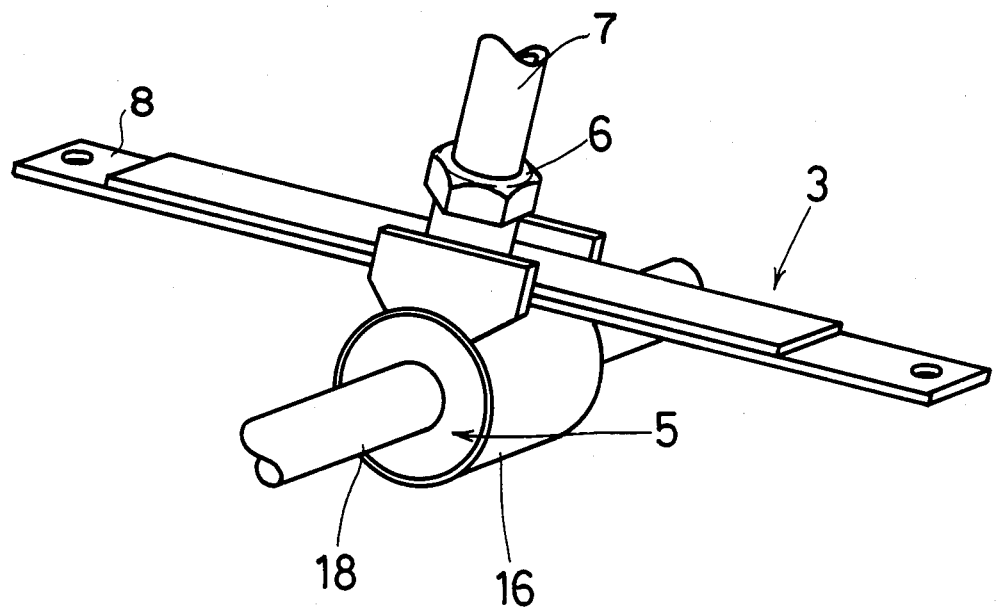
FIG. 2 is an isometric view of the leaf spring set of FIG. 1.

Referring firstly to FIG. 1, there is provided a bicycle comprising a front wheel mounting (1), a rear wheel mounting (2) and a leaf spring set, generally indicated by the numeral (3), which is adapted to bias the two mountings in the same generally downwards direction with respect to a seat (4) and to enable the mountings to pivot about a substantially single pivotal point which is midway between the front and rear wheel axles.

Attached to the leaf spring set are a pedal mechanism (5) and a seat mounting (6). The leaf spring set (3) comprises three spring steel leaf springs and is located between the pedal mechanism and seat mounting by means of a bolt integral with the seat member passing through a central aperture in the leaf spring set and into a threaded bore in the pedal mechanism housing.

The seat mounting includes a tubular member (7) which extends generally perpendicularly to the leaf spring set (3) and terminates in the seat or saddle (4) of the bicycle.

The leaf spring set is mounted at each end of the main leaf spring (8) to the front and rear wheel mountings (9) and (10) respectively using suitable bolts passing through corresponding apertures in the mountings and the main leaf spring of the leaf spring set. The rear wheel mounting comprises a fork (11) which encompasses the rear wheel and the front wheel, mounting is a fork (12) pivotally mounted in a steering bearing housing (13) and attached to handlebars (14) for the bicycle. The housing (13) is in turn attached to the leaf spring set by a transverse member (15). The dimension of the transverse member, the leaf spring set and the rear fork are such that the pedal mechanism and seat mounting are centrally located with respect to the axles of the front and rear wheels.

The pedal mechanism comprises a housing (16) and a driving sprocket (17) attached to a suitable shaft (18)

passing through the pedal housing (16) in known manner. Pedals (19) are mounted to pedal members (20) in the normal way.

A drive chain (21) passes over the driving sprocket (17), a driven sprocket (22) co-axial with the rear wheel (23) and a chain tensioner (24). The chain tensioner is required because the distance between the two sprockets changes according to the configuration of the leaft spring set during use of the bicycle.

Figure 3:
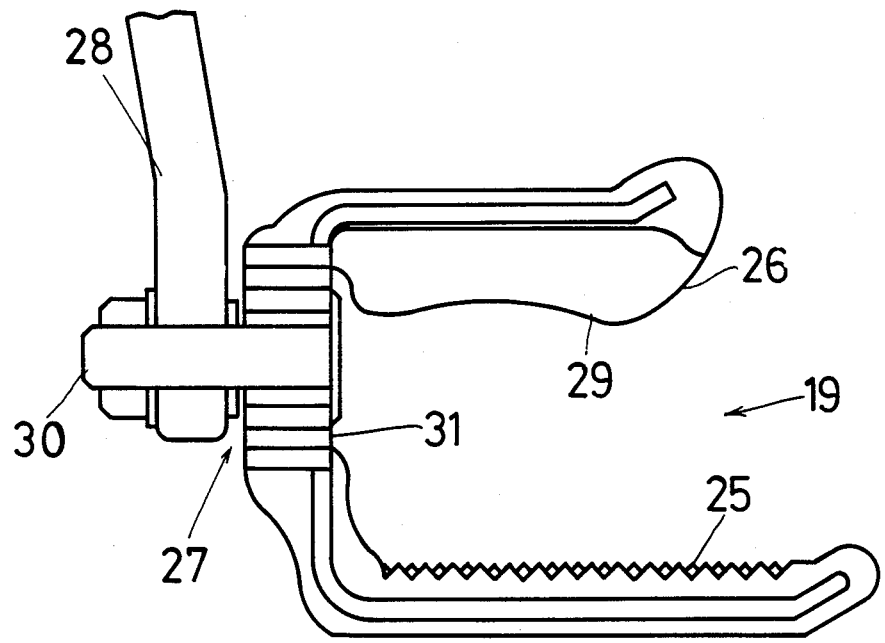
FIG. 3 is a side view of a pedal for the bicycle.

As shown in FIG. 3 each pedal (19) comprises a lower pedal member (25) and an upper lifting member (26) which are joined at one end to form a flattened 'C' shape, and a formation generally indicated by numeral (27) for attachment of the pedal to the pedal support (28).

This embodiment of the invention provides for a moulded padding (29) integral with the upper lifting member. The lower surface of the padding is shaped complementary to a human foot and is of sufficient area to enable application of an unward force by a rider, using his or her feet, without discomfort to the rider.

The formation used to locate the pedal relative to a standard pedal support and hence pedal mechanism is of standard design. The formation is comprised of a screw threaded stub axle (30) surrounded by a bearing device (31) which maintains the pedal in a level position. The stub axle and screw thread are of standard dimension and are complementary to a standard pedal support mounting.

The joining of the front and rear wheel mountings by means of a single leaf spring set, that is with no other stabilizing frames or springs, results in two types of resilient movement for the bicycle as a whole. The first and most obvious type is the spring or biased rotational movement of the two wheels about a central position which is the point of loading of the bicycle and hence the position of fixture of the pedal mechanism and the seat mounting. The design of the leaf spring set is such that not only does it provide a shock absorber effect, but the extent of the resilience allows the bicycle to be "jumped" by the rider effecting a downward loading of short duration. The extent to which this jumping is possible is increased by the use of the pedals described which allow for an upward force to be exerted on the bicycle. The use of the chain tensioner enables drive chain tension to be maintained during jumping when the inter axial distance of the sprockets may change because of the inexact nature of the points about which the wheel mountings rotate.

The second type of movement is the relative twisting of the front and rear wheels with respect to each other which is provided for by the leaf spring set. This twisting is particularly important during acceleration and enables a large force to be applied to one pedal with a consequent shift in the centre of gravity of the rider while still maintaining good traction.

From the description of the preferred embodiment it will be appreciated that the bicycle may be easily dismantled simply by removing the bolts connecting the leaf spring set to the front and rear wheel mountings.

It will be further understood that numerous variations may be made to the above described embodiment of the invention without departing from the scope hereof. Particularly it should be noted that the leaf spring set may include a single leaf spring and the leaf springs may be of materials other than spring steel and may be of other cross sectional configurations. Here it is particularly envisaged that materials such as fibre reinforced plastics may be used.

What we claim is:

1. A bicycle frame comprising a single leaf spring set which is substantially rectilinear in an unloaded condition, a rear wheel mounting connected to said leaf spring set and including rear fork means extending rearward from a rear end of said leaf spring set in rectilinear configuration with said leaf spring set for mounting an axle of a rear wheel, a front wheel mounted connected to said leaf spring set and including a front frame member extending forward from a front end of said leaf spring set in rectilinear configuration with said leaf spring set and front fork means pivotally mounted to said front frame member on a steering axis transverse to said front frame member for mounting an axle of a front wheel, said leaf spring set being the sole framing element through which said front and rear wheel mountings are connected, and a seat mounting and a pedal drive mechanism both fixed to said leaf spring set substantially centrally of both said leaf spring set and respective axle locations for the front wheel and the rear wheel, whereby said front and rear wheel mountings pivot about a single pivotal position when a load is placed on said seat mounting.

2. A bicycle frame as claimed in claim 1, in which said seat mounting includes a mounting member extending substantially perpendicularly to said leaf spring set.

3. A bicycle frame as claimed in claim 1, in which said pedal drive mechanism comprises a chain driving sprocket rotatably mounted to said leaf spring set, and a set of foot pedal means connected to said chain driving sprocket for rotating said driving sprocket.

4. A bicycle frame as claimed in claim 1, in which said pedal drive mechanism includes foot pedals, each foot pedal comprising a load bearing lower member, a lifting upper member spaced from a load bearing side of said lower member, and means joining respective ends of said lower member and upper member together at one side of said foot pedal and including a pedal locating formation disposed between said ends of said lower and upper members.

5. A bicycle frame as claimed in claim 4, in which said pedal location information includes a stub axle mounted between said ends of said lower and upper members.

6. A bicycle comprising a bicycle frame as claimed in claim 1, a front wheel having an axle mounted to said front fork means, a rear wheel having an axle mounted to said rear fork means, a seat mounted to said seat mounting, and chain drive means drivingly connecting said pedal drive mechanism to said rear wheel such that said rear wheel may be driven by said pedal drive mechanism.

* * * * *